United States Patent
Bae

[11] Patent Number: 5,680,169
[45] Date of Patent: Oct. 21, 1997

[54] APPARATUS FOR PRESSING THERMOSENSITIVE RECORDING HEAD OF FACSIMILE MACHINE

[75] Inventor: Chi-Wan Bae, Gumi, Rep. of Korea

[73] Assignee: SamSung Electronics Co., Ltd., Suwon, Rep. of Korea

[21] Appl. No.: 703,651

[22] Filed: Aug. 27, 1996

[30] Foreign Application Priority Data

Aug. 28, 1995 [KR] Rep. of Korea ............... 26971/1995

[51] Int. Cl.⁶ .................... B41J 25/304; B41J 25/316
[52] U.S. Cl. ......................................................... 347/197
[58] Field of Search ......................... 347/197; 400/120.16

[56] References Cited

U.S. PATENT DOCUMENTS

| | | |
|---|---|---|
| 4,342,040 | 7/1982 | Fujita et al. . |
| 4,641,980 | 2/1987 | Matsumoto et al. . |
| 4,816,842 | 3/1989 | Hasegawa et al. . |
| 4,855,755 | 8/1989 | Aizawa . |
| 4,855,756 | 8/1989 | Gluck et al. . |
| 4,884,904 | 12/1989 | Berquist . |
| 4,928,134 | 5/1990 | Hasegawa et al. . |
| 5,023,628 | 6/1991 | Koch . |
| 5,055,858 | 10/1991 | Koch . |
| 5,063,395 | 11/1991 | Nuita et al. . |
| 5,106,212 | 4/1992 | Endo et al. . |
| 5,114,251 | 5/1992 | Mahoney ............... 400/120.16 |
| 5,153,606 | 10/1992 | Bas . |
| 5,198,836 | 3/1993 | Saito et al. . |
| 5,245,356 | 9/1993 | Ota et al. . |
| 5,272,488 | 12/1993 | Kim . |
| 5,304,007 | 4/1994 | Flanagan . |
| 5,447,379 | 9/1995 | Pou . |

*Primary Examiner*—Huan H. Tran
*Attorney, Agent, or Firm*—Robert E. Bushnell, Esq.

[57] ABSTRACT

An apparatus for pressing a thermosensitive recording head of a facsimile machine includes a W-shaped leaf spring for pressing the thermosensitive recording head to a roller so as to contact each other with a prescribed pressure, and contact portions respectively formed on both ends of the leaf spring for contacting to support the thermosensitive recording head. The slanted portions of the leaf spring have a prescribed angle for allowing the head to move upward and downward according to the elasticity of the spring, and a central portion of the spring is formed with a first flat portion for guiding to smoothly fix the spring to a pin of a lower frame. One side of the first flat portion is fitted with the projection of the front frame. A hole is formed in the center of the first flat portion for insertedly receiving the pin of the lower frame for inhibiting the movement of the spring.

19 Claims, 3 Drawing Sheets

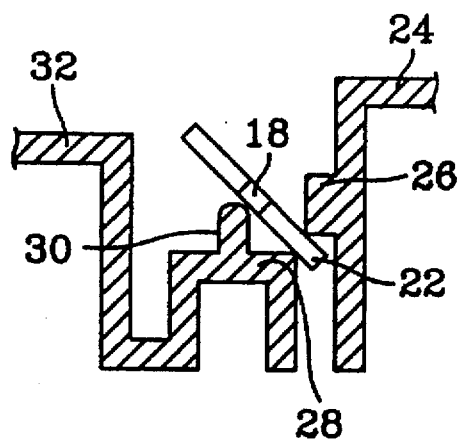
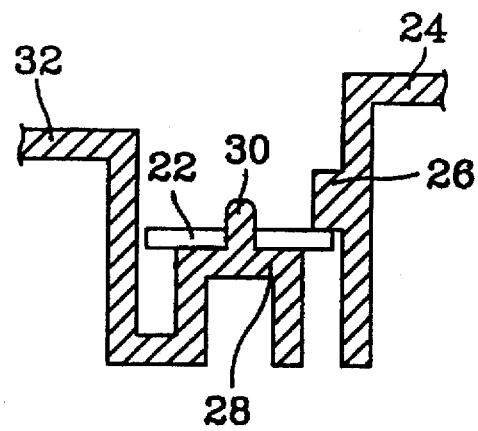
Fig. 5A                Fig. 5B
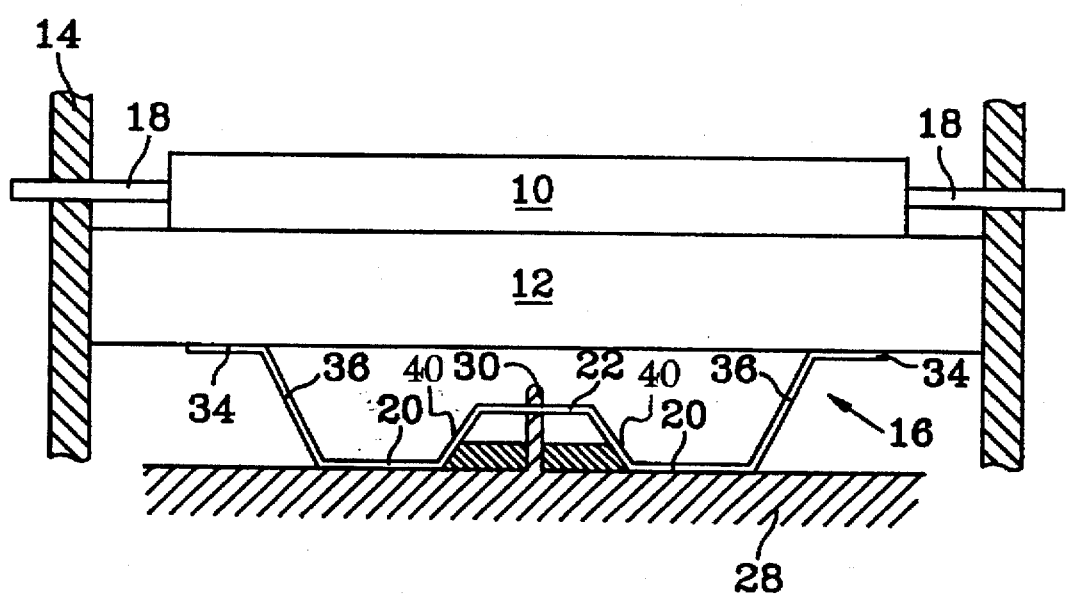
Fig. 6

APPARATUS FOR PRESSING THERMOSENSITIVE RECORDING HEAD OF FACSIMILE MACHINE

CROSS REFERENCE TO RELATED APPLICATIONS

This application make reference to, incorporates the same herein, and claims all benefits accruing under 35 U.S.C §119 from an application entitled APPARATUS FOR PRESSING THERMOSENSITIVE RECORDING HEAD OF FACSIMILE SYSTEM earlier filed in the Korean Industrial Property Office on the 28 Aug. 1995 and there duly assigned Serial No. 26971/1995.

BACKGROUND OF THE INVENTION

1. Field of the Invention

The present invention relates to a facsimile machine, and more particularly to an apparatus for pressing a thermosensitive recording head of a facsimile machine using a simplified elastic element for applying a prescribed pressure to the thermosensitive recording head.

2. Description of the Related Art

In a conventional facsimile machine, recording paper is moved between a roller and a thermosensitive recording head to allow information to be recorded on the recording paper. It is necessary for the thermosensitive recording head and the roller to be in contact with each other at a prescribed pressure. In conventional facsimile machines, a pair of leaf springs have been used to press the roller into the thermosensitive recording head. The pair of leaf springs are normally secured to the frame by means of rivets or screws. The use of rivets of screws requires additional, albeit unnecessary, assembly steps which increase the assembly cost of the facsimile machine and in addition, the rivets or screws may come loose after prolonged use of the facsimile machine, resulting in the displacement of the leaf springs and problems with the facsimile machine.

Kim, U.S. Pat. No. 5,274,488 entitled PRESS DEVICE FOR PRINTING HEAD, attempts a technique for pressing the thermosensitive recording head to a roller. I have found however, that the technique requires numerous additional elements which must be attached with screws to the recording head as well as complicated sheet metal element used to press the recording head to the roller.

The later effort of Flanagan, U.S. Pat. No. 5,304,007 entitled THERMAL PRINTHEAD BALANCED SPRING MOUNT, uses a single leaf spring to press the recording head to the roller. I have noticed however, the lead spring of Flanagan is somewhat difficult to produce and further requires a complicated cam mechanism to compress the leaf spring.

Figita, et al., U.S. Pat. No. 4,342,040 entitled HEAT SENSITIVE RECORDING SYSTEM, is but one representative of many examples of arrangements in which two or more coil springs are utilized to press the thermosensitive recording head into the roller. I have found however, the use of the two or more coil springs, as with the pair of leaf springs, usually adds a considerable number of extra elements which increase the manufacturing and assembly cost of the facsimile machine.

As illustrated in FIG. 6 of the two Hasegawa, et al. patents, U.S. Pat. Nos. 4,928,134 and 4,816,842 both entitled PLATEN FOR THERMAL TRANSFER PRINTER, an elastic member 12, which appears to consist of multiple sections, can be used to push the platen into the roller. The Hasegawa, et al. patents further indicate that the elastic member may be fabricated of a sponge, a foamed member, or an air cushion, in addition to a leaf spring and a coil spring. Hasegawa, et al. fails to show any interrelationship of the various portions of the elastic member 12 and their attachment to the plate 13.

SUMMARY OF THE INVENTION

Accordingly, it is an object of the present invention to provide an improved facsimile telecommunication process and apparatus.

It is another object to provide an apparatus for pressing a thermosensitive recording head of a facsimile machine without using a separate element when fixing an elastic body.

It is yet another object to provide a telecommunications facsimile apparatus for pressing a thermosensitive recording head by means of a single elastic body.

It is still another object provide a telecommunications facsimile apparatus for pressing a thermosensitive recording head of a facsimile machine that can be constructed at reduced manufacturing cost.

It is still yet another object to provide a telecommunications facsimile apparatus that can be assembled with a reduction in per unit assembly line time during manufacture reducing the assembly time of the machine.

It is a further another object to provide a telecommunications facsimile apparatus and process for enhancing productivity.

It is a still further object to provide an apparatus capable of pressing a thermosensitive recording head with a constant pressure.

To achieve the above and other objects of the present invention, an apparatus for pressing a thermosensitive recording head of a facsimile machine includes a W shaped leaf spring for pressing the thermosensitive recording head into contact with the circumferential exterior surface of a roller with a prescribed pressure, and having contact portions respectively formed on both ends of the leaf spring for contacting to support the thermosensitive recording head. Legs of the leaf spring are formed so as to have a prescribed angle for allowing the head to move upward and downward in accordance with the elasticity of the spring, and a central portion of the leaf spring being formed with a first flat portion for guiding to smoothly fix the spring to a pin of a lower frame. In addition, the first flat portion of the spring is fitted with the projection of the front frame. A hole is formed in the center of the first flat portion for insertedly receiving the pin of the lower frame, and one side of the front frame is formed with the projection for guiding and supporting the spring. Also, the pin for spring the elastic member is formed on one side of the lower frame, thereby inhibiting the movement of the spring.

BRIEF DESCRIPTION OF DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 5A and 5B are sectional views showing an assembling state of the apparatus for pressing the thermosensitive recording head of the telecommunications facsimile machine constructed according to the principles of the present invention; and FIG. 6 is a sectional view showing another embodiment of the apparatus for pressing the thermosensitive recording head of the telecommunications facsimile machine constructed according to the principles of the present invention.

DETAILED DESCRIPTION OF THE PREFERRED EMBODIMENTS

Figure 1:
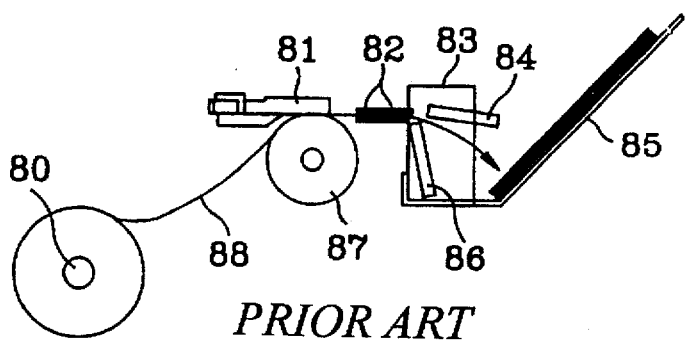
FIG. 1 is a schematic view endeavoring to show the salient features of a construction of a general representation of a hypothetical conventional telecommunications facsimile machine.

Referring to FIG. 1, an operational state of a generally-used facsimile system will be described. A roll of recording paper 88 which is stored on a roll 80 passes over a roller 87, and information is recorded on the recording paper 88 by means of a thermosensitive recording head 81. Thereafter, the recording paper 88 having recorded information is transferred by the rotation of the roller 87 which is installed below the thermosensitive recording head 81. The recording paper 88 is guided by upper and lower guides 82 and cut by an automatic cutter 83 to a prescribed length while passing between a fixed blade 84 and a cutting blade 86 which constitute the automatic cutter 83. The cut paper is sequentially stacked on a supporting stand 85.

Figure 2:
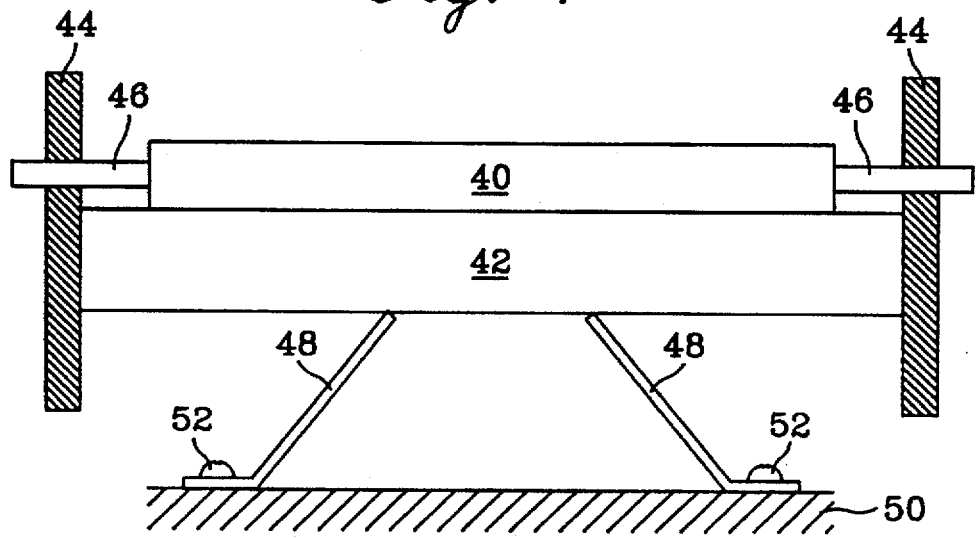
FIG. 2 is a sectional view showing an apparatus for pressing a thermosensitive recording head of the hypothetical conventional facsimile machine.

FIG. 2 illustrates a sectional view showing an apparatus for pressing a thermosensitive recording head of a conventional facsimile machine. A roller 40 transfers the recording paper in accordance with a driving force of a driving motor (not shown), and a shaft 46 for transferring the driving force of the driving motor to the roller 40 is installed on either side of roller 40. A thermosensitive recording head 42 for recording the transmitted data on the recording paper is installed below the roller 40. The thermosensitive recording head 42 and roller 40 are fixed to lateral frames 44, and elastic bodies 48 press the thermosensitive recording head 42 into the roller 40 so that they contact each other with a prescribed pressure. The elastic bodies 48 are installed on one side of a lower frame 50 so as contact both bottom sides of the thermosensitive recording head 42. The elastic bodies 48 are affixed to the lower frame 50 by means of rivets 52.

In the apparatus for pressing the thermosensitive recording head of the facsimile machine constructed as above, after the elastic bodies 48 are affixed to the lower frame 50 using rivets 52, the thermosensitive recording head 42 is installed above the elastic bodies 48. Both ends of thermosensitive recording head 42 are supplied with the prescribed pressure by the elasticity of the respective elastic bodies 48.

When adopting the above method, two elastic bodies 48 press the thermosensitive recording head 42, which increase the number of the elements with the consequence of raising the cost of the machine. In addition, rivets 52 are used for fixing the elastic bodies 48 to the lower frame 50, thereby increasing the cost of the elements. Furthermore, the attaching of the rivets 52 increases the assembly time so as to decrease productivity, and the rivets 52 become loose when using the facsimile machine for a long time period, causing the elastic bodies 48 to deviate from their initial position, which impedes the pressing upon thermosensitive recording head 42 by the prescribed pressure.

Figure 3:
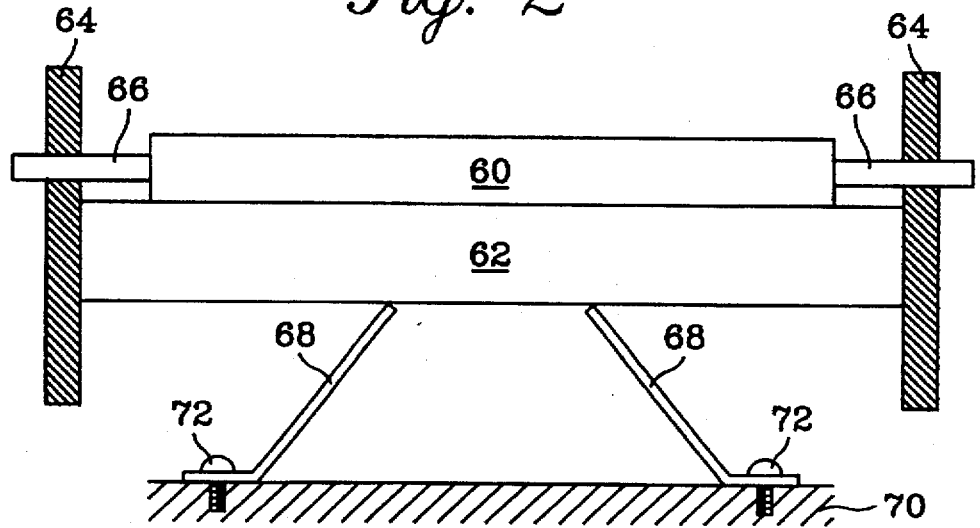
FIG. 3 is a sectional view showing another example of an apparatus for pressing the thermosensitive recording head of a representation of a hypothetical conventional telecommunications facsimile machine.

FIG. 3 is a sectional view showing another example of an apparatus for pressing the thermosensitive recording head of a facsimile machine. Here, a roller 60 transfers the recording paper in accordance with a driving force of a driving motor, and a shaft 66 for transferring the driving force of the driving motor to the roller 60 is installed on either side of the roller 60. A thermosensitive recording head 62 for recording the information on the recording paper is installed below the roller 60. The thermosensitive recording head 62 and roller 60 are fixed to lateral frames 64. Elastic bodies 68 press the thermosensitive recording head 62 into the roller 60 so that they contact each other with a prescribed pressure. The elastic bodies 68 are installed on one side of a lower frame 70 so as to contact both bottom sides of the thermosensitive recording head 62, and the elastic bodies 68 are affixed to lower frame 70 by driving screws 72.

In the apparatus for pressing the thermosensitive recording head of the facsimile machine constructed as above, the screws 72 are driven to affix elastic bodies 68 to the lower frame 70. The thermosensitive recording head 62 is installed above the elastic body 68. Both ends of the thermosensitive recording head 62 are supplied with the prescribed pressure by the respective elastic bodies 68.

When using the above method, the thermosensitive recording head 62 is pressed by means of the two elastic bodies 68 to increase the number of elements, thereby raising the cost. Also, the screws 72 used for affixing the elastic bodies 68 to the lower frame 70 increase the cost of the elements. Furthermore, the screws 72 must be driven which increase the man-hour needed in assembling the machine with the consequence of decreasing productivity. Furthermore, the screws 72 may loosen when using the facsimile machine for a long time period, causing the elastic bodies 68 to deviate from their initial position so as to be unable to press the thermosensitive recording head 62 by the prescribed pressure.

Figure 4:
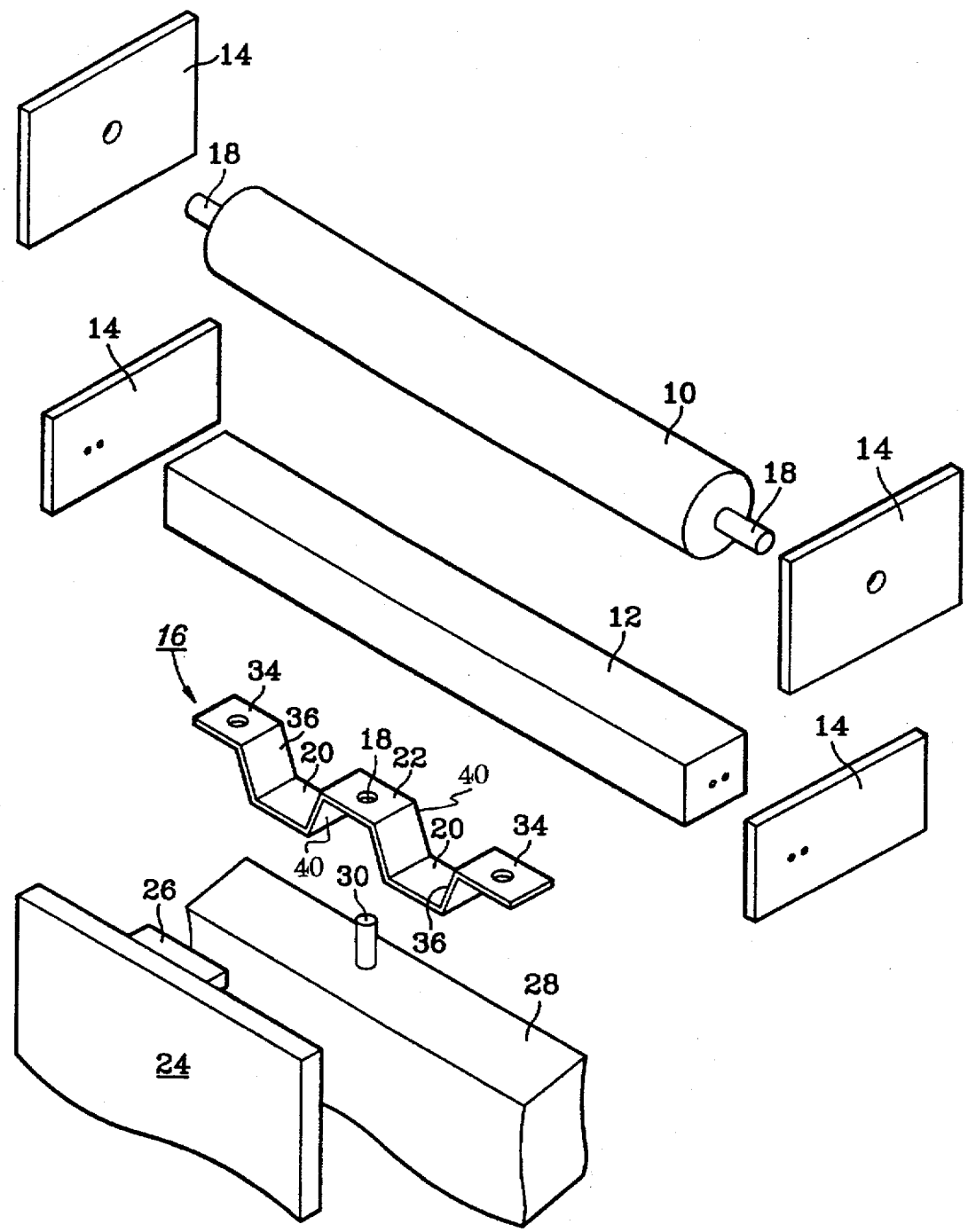
FIG. 4 is an exploded view showing an embodiment of an apparatus for pressing a thermosensitive recording head of a telecommunications facsimile machine constructed according to the principles of the present invention.

As shown in FIGS. 4 and 6, the apparatus for pressing the thermosensitive recording head of the facsimile machine according to the present invention includes a roller 10 for transferring a received sheet of recording paper by means of a driving force of a driving motor (not shown). A shaft 18 is installed on both sides of the roller 10 for transmitting the driving force of the driving motor to the roller 10, and a thermosensitive recording head 12 for information on the recording paper is installed below the roller 10. Roller 10 and thermosensitive recording head 12 are fixed to lateral frames 14, and an elastic body 16 formed of a leaf spring is installed below the thermosensitive recording head 12 for pressing thermosensitive recording head 12 and roller 10 together so as to contact each other with a prescribed pressure. Contact portions 34 are respectively formed on both ends of the elastic body 16 for contacting to support the thermosensitive recording head 12. Adjacent one side of each contact portion 34 is a slanted portion 36 inclined at a prescribed angle for allowing for the up and down movement of the head 12 by means of the elasticity of the elastic body 16. Adjacent one side of each slanted portion 36 is a first flat portion 20 for guiding elastic body 16 to be smoothly fitted to a projection 26 of a front frame 24, and adjacent one side of each first flat portion 20 is an additional slanted portion 40 adjacent to a single second flat portion 22. A hole 18 for insertedly receiving pin 30 of lower frame 28 is formed in the center of second flat portion 22. The elastic body 16 is formed to have a symmetrical structure for consistently pressing one side of thermosensitive recording head 12. One side of front frame 24 is formed with the projection 26 for guiding and supporting the elastic body 16, and one side of the lower frame 28 is formed with pin 30 for fixing the elastic body 16 to inhibit the movement thereof.

As shown in FIGS. 4, 5A and 5B, the front portions of respective first flat portions 20 of the elastic body 16 face downward, and the second flat portion 22 of the elastic body 16 is fitted to the end of projection 26 of the from frame 24. By doing so, the pin 30 of the lower frame 28 is inserted into hole 18 of the second flat portion 22 to fix the elastic body 16. The thermosensitive recording head 12 is installed to be placed on respective contact portions 34 of the elastic body 16. Both ends of the thermosensitive recording head 12 are supplied with the prescribed pressure by the elastic body 16. The roller 10, which contacts the thermosensitive recording head 12, and the shaft 18 of the roller 10 are affixed to lateral frames 14 to inhibit the movement thereof.

In the apparatus for pressing the thermosensitive recording head of the facsimile machine according to the present invention described as above, the elastic body is fixed by means of the projection and the pin formed in the flames without employing a separate dement during the assembly operation to reduce the cost. Moreover, the thermosensitive recording head is pressed by the single elastic member to enable a uniform exertion of pressure. Furthermore, since the typical screwing and riveting operations are not required during the attaching of the elastic body, assembly time can be reduced. Accordingly, the element is simplified to simplify and facilitate the assembling of the elastic body, thereby enhancing productivity.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for pressing a thermosensitive-recording head of a facsimile machine comprising:
   a roller for transferring a recording paper;
   a shaft affixed to either side of said roller for supporting said roller;
   said thermosensitive recording head for recording transmitted data on said recording paper;
   a W-shaped leaf spring for pressing said thermosensitive recording head into said roller such that they contact each other with a prescribed pressure;
   a pair of lateral flames respectively disposed on either side of said roller and head, said roller and head being affixed between said pair of lateral frames;
   a projection for guiding and supporting said leaf spring; and
   a pin for fixing said leaf spring to inhibit movement thereof.

2. The apparatus as claimed in claim 1, wherein said projection is formed on one side of a front frame of a main body of said facsimile machine.

3. The apparatus as claimed in claim 2, comprised of a central portion of said leaf spring formed with a first flat portion which is fitted with said projection of said front frame.

4. The apparatus as claimed in claim 1, comprised of said pin being formed on one side of a lower frame of main body of said facsimile machine.

5. The apparatus as claimed in claim 4, comprised of a central portion of said leaf spring formed with a first flat portion for guiding to fix said leaf spring to said pin of said lower frame.

6. The apparatus as claimed in claim 5, comprised of a center of said first flat portion being an aperture for receiving said pin of said lower frame.

7. The apparatus as claimed in claim 6, comprised of said lower frame includes a projection contacting said first flat portion of said spring and also contacts angular portions of said spring disposed on either side of said first flat portion of said spring.

8. The apparatus as claimed in claim 1, comprised of said leaf spring having a structure symmetrical to the left and right for consistently pressing upon one plane of said thermosensitive recording head.

9. The apparatus as claimed in claim 1, comprised of contact portions formed on both ends of said leaf spring for contacting to support said thermosensitive recording head.

10. In a thermal transfer recording system having a thermosensitive recording head and a roller for transferring a recording paper and a shaft affixed to either side of said roller for supporting said roller, said thermosensitive recording head recording data on said recording paper, an improved apparatus for pressing said thermosensitive recording head into said roller comprising:
    a W-shaped leaf spring for pressing said thermosensitive recording head into said roller such that they contact each other with a prescribed pressure;
    a pair of lateral flames respectively disposed on either side of said roller and head, said roller and head being affixed between said pair of lateral frames;
    a projection for guiding and supporting said leaf spring; and
    a pin for fixing said leaf spring to inhibit movement thereof.

11. The apparatus as claimed in claim 10, comprised of said projection formed on one side of a from frame of a main body of said facsimile machine.

12. The apparatus as claimed in claim 11, comprised of a central portion of said leaf spring formed with a first flat portion which is fitted with said projection of said front frame.

13. The apparatus as claimed in claim 10, comprised of said pin formed on one side of a lower frame of main body of said facsimile machine.

14. The apparatus as claimed in claim 13, comprised of a central portion of said leaf spring formed with a first flat portion for guiding to fix said leaf spring to said pin of said lower frame.

15. The apparatus as claimed in claim 14, comprised of a center of said first flat portion being an aperture for insertedly receiving said pin of said lower frame.

16. The apparatus as claimed in claim 15, comprised of said lower frame includes a projection contacting said first flat portion of said spring and also contacts angular portions of said spring disposed on either side of said first flat portion of said spring.

17. The apparatus as claimed in claim 10, comprised of said leaf spring having a structure symmetrical to the left and right for consistently pressing upon one plane of said thermosensitive recording head.

18. The apparatus as claimed in claim 10, comprised of contact portions formed on both ends of said leaf spring for contacting to support said thermosensitive recording head.

19. An apparatus for pressing a thermosensitive recording head of a thermal transfer recording apparatus, comprising:

a roller for transferring a recording paper;

a shaft affixed to either side of said roller for supporting said roller;

said thermosensitive recording head for recording data on said recording paper;

a W-shaped leaf spring for pressing said thermosensitive recording head into said roller such that they contact each other with a prescribed pressure;

a pair of lateral frames respectively disposed on either side of said roller and head, said roller and head being affixed between said pair of lateral frames;

a projection for guiding and supporting said leaf spring; said projection being formed on one side of a front frame of a main body of said facsimile machine; and a pin for fixing said leaf spring to inhibit movement thereof; said pin being formed on one side of a lower frame of main body of said facsimile machine;

said leaf spring having a structure symmetrical to the left and fight for consistently pressing upon one plane of said thermosensitive recording head;

said leaf spring having contact portions formed on both ends of said leaf spring for contacting to support said thermosensitive recording head;

a central portion of said leaf spring being formed with a first flat portion for guiding to fix said leaf spring to said pin of said lower frame; and said first flat portion being fitted with said projection of said front frame and including an aperture for insertedly receiving said pin of said lower frame.

* * * * *